United States Patent
Lin (10) Patent No.: US 11,300,686 B2
(45) Date of Patent: Apr. 12, 2022

(54) VIRTUAL REFERENCE STATION SWITCHING METHOD AND DEVICE IN REAL TIME KINEMATIC SYSTEM

(71) Applicant: Huawei Technologies Co., Ltd., Shenzhen (CN)

(72) Inventor: Yangbo Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 16/458,745

(22) Filed: Jul. 1, 2019

(65) Prior Publication Data

US 2019/0324149 A1 Oct. 24, 2019

Related U.S. Application Data

(63) Continuation of application No. PCT/CN2017/119105, filed on Dec. 27, 2017.

(30) Foreign Application Priority Data

Dec. 31, 2016 (CN) .......................... 201611267041.2

(51) Int. Cl.
*G01S 19/07* (2010.01)
*H04L 41/147* (2022.01)
(Continued)

(52) U.S. Cl.
CPC ............ *G01S 19/073* (2019.08); *G01S 19/07* (2013.01); *H04L 41/0813* (2013.01); *H04L 41/147* (2013.01); *G01S 19/04* (2013.01)

(58) Field of Classification Search
None
See application file for complete search history.

(56) References Cited

U.S. PATENT DOCUMENTS

| 6,799,116 B2 * | 9/2004 | Robbins .................. G01S 19/04 701/469 |
| 2005/0064878 A1 | 3/2005 | O'Meagher |

(Continued)

FOREIGN PATENT DOCUMENTS

| CN | 101498785 A | 8/2009 |
| CN | 102326094 A | 1/2012 |

(Continued)

OTHER PUBLICATIONS

14. Janssen, Volker. "A Comparison of the VRS and MAC Principles for Network RTK." International Global Navigation Satellite Systems Society, IGNSS Symposium. pp. 1-13. Dec. 2009 (Year: 2009).*

(Continued)

*Primary Examiner* — Gregory C. Issing
(74) *Attorney, Agent, or Firm* — Conley Rose, P.C.

(57) ABSTRACT

A virtual reference station switching method includes obtaining networking change information of a reference station network, obtaining prediction information based on the networking change information of the reference station network, where the prediction information includes a reference station combination used to calculate a virtual reference station of a mobile station is switched from a first reference station combination to a second reference station combination, obtaining a first virtual reference station through calculation based on the first reference station combination, and obtaining a second virtual reference station through calculation based on the second reference station combination, and providing at least one of first virtual reference station information or second virtual reference station information to the mobile station.

11 Claims, 7 Drawing Sheets

(51) Int. Cl.
*H04L 41/0813* (2022.01)
*G01S 19/04* (2010.01)

(56) References Cited

U.S. PATENT DOCUMENTS

| | | | |
|---|---|---|---|
| 2010/0079333 | A1 | 4/2010 | Janky et al. |
| 2011/0285586 | A1 | 11/2011 | Ferguson |
| 2011/0285587 | A1 | 11/2011 | Vollath et al. |
| 2013/0234885 | A1 | 9/2013 | Geier et al. |
| 2013/0335266 | A1 | 12/2013 | Vollath et al. |
| 2014/0043187 | A1* | 2/2014 | Ellum ............... G01S 19/04 342/357.27 |

FOREIGN PATENT DOCUMENTS

| | | |
|---|---|---|
| CN | 102869089 A | 1/2013 |
| CN | 103502843 A | 1/2014 |
| CN | 103543454 A | 1/2014 |
| CN | 102761961 B | 2/2015 |
| CN | 102739301 B | 5/2015 |
| CN | 105353391 A | 2/2016 |
| CN | 106226784 A | 12/2016 |
| JP | 2002318270 A | 10/2002 |
| JP | 2002318272 A | 10/2002 |
| JP | 2002340589 A | 11/2002 |
| JP | 2005172738 A | 6/2005 |
| JP | 2005189059 A | 7/2005 |
| JP | 2005241517 A | 9/2005 |
| JP | 2009257802 A | 11/2009 |
| JP | 2011149720 A | 8/2011 |
| JP | 2016128771 A | 7/2016 |
| KR | 20130072196 A | 7/2013 |
| KR | 101436102 B1 | 9/2014 |
| KR | 101626852 B1 | 6/2016 |
| KR | 20200040333 A | 4/2020 |
| KR | 20200072206 A | 6/2020 |
| WO | 2011034614 A2 | 3/2011 |

OTHER PUBLICATIONS

Machine Translation and Abstract of Chinese Publication No. CN101498785, Aug. 5, 2009, 11 pages.
Machine Translation and Abstract of Chinese Publication No. CN102739301, May 20, 2015, 18 pages.
Machine Translation and Abstract of Chinese Publication No. CN102761961, Feb. 18, 2015, 21 pages.
Machine Translation and Abstract of Chinese Publication No. CN102869089, Jan. 9, 2013, 19 pages.
Machine Translation and Abstract of Chinese Publication No. CN103543454, Jan. 29, 2014, 13 pages.
Machine Translation and Abstract of Chinese Publication No. CN105353391, Feb. 24, 2016, 20 pages.
Machine Translation and Abstract of Japanese Publication No. JP2011149720, Aug. 4, 2011, 11 pages.
"3rd Generation Partnership Project; Technical Specification Group Services and System Aspects; Feasibility Study on New Services and Markets Technology Enablers; Stage 1 (Release 14)," 3GPP TR 22.891 V14.2.0, Sep. 2016, 95 pages.
NGMN, "NGMN 5G White Paper," Next Generation Mobile Network Alliance, White Paper, 2015, 125 pages.
Foreign Communication From A Counterpart Application, PCT Application No. PCT/CN2017/119105, English Translation of International Search Report dated Mar. 23, 2018, 2 pages.
Foreign Communication From A Counterpart Application, PCT Application No. PCT/CN2017/119105, English Translation of Written Opinion dated Mar. 23, 2018, 5 pages.
Foreign Communication From A Counterpart Application, European Application No. 17887899.7, Extended European Search Report dated Jan. 7, 2020, 6 pages.

* cited by examiner

VIRTUAL REFERENCE STATION SWITCHING METHOD AND DEVICE IN REAL TIME KINEMATIC SYSTEM

CROSS-REFERENCE TO RELATED APPLICATIONS

This application is a continuation of International Application No. PCT/CN2017/119105, filed on Dec. 27, 2017, which claims priority to Chinese Patent Application 201611267041.2, filed on Dec. 31, 2016, both of which are hereby incorporated by reference in their entireties.

TECHNICAL FIELD

The present disclosure relates to the high-precision positioning field, and in particular, to a virtual reference station switching method and device in a real time kinematic system.

BACKGROUND

Real Time Kinematic (RTK) is also referred to as carrier phase differential, and is a technology that is used to enhance position data precision of the Global Navigation Satellite System (GNSS) such as the Global Positioning System (GPS), the Global Navigation Satellite System (GLONASS), the GALILEO, or the BEIDOU. Measurement is performed by using a signal carrier phase, and real-time correction is provided for a measurement value of a mobile station based on a measurement value of a single reference station to implement centimeter-level precision.

Network real time kinematic (NRTK) is also referred to as a virtual reference station (VRS), and is provided to overcome a disadvantage that validity of RTK correction data is affected by a distance between the mobile station and the reference station. Use of RTK is extended to an entire reference station network. A virtual reference station that is relatively close to the mobile station is obtained through calculation based on the reference station network to replace a real reference station to provide real-time correction for the mobile station.

A Continuously Operating Reference Station (CORS) is a system that is established by using an NRTK technology and that may continuously provide a positioning service, and has advantages such as a wide range, high precision, and being always available. Several permanently continuously operating datum stations/reference stations are established, and station coordinates of the datum stations and GNSS measurement data that are of a universal format are provided to meet positioning and navigation requirements of users in various industries, for example, land survey and environment monitoring.

An NRTK/CORS system generally includes a datum station, a mobile station, a central station, and a communications network.

The datum station is a fixed reference station, and provides GNSS measurement data to the central station in real time. The datum station forms a datum station/reference station network, and at least three fixed reference stations are required to calculate a virtual reference station.

The mobile station is user equipment, and obtains GNSS measurement data of the virtual reference station from the central station. The mobile station may provide coarse position information of the mobile station to the central station such that the central station can pertinently provide a service, for example, calculate a virtual reference station that is relatively close to the mobile station.

The central station is used as a system core, calculates the virtual reference station and the GNSS measurement data of the virtual reference station based on the datum station and the GNSS measurement data of the datum station, and provides the GNSS measurement data of the virtual reference station to the mobile station. The central station may pertinently provide a service based on the coarse position information provided by the mobile station, for example, select a datum station that is most appropriate for the mobile station with respect to positions, and calculate a virtual reference station that is relatively close to the mobile station.

The communications network is connected to the datum station, the mobile station, and the central station. Usually, the datum station and the central station are connected in a wired manner (for example, a fiber), and the central station and the mobile station are connected in a wireless manner (for example, Global System for Mobile communications (GSM)/Long Term Evolution (LTE)).

Reliability and accuracy of the NRTK/CORS system depend on density and performance of the datum station/reference station network in the NRTK/CORS system.

An existing NRTK/CORS system is mainly applied to industries such as land survey and environment monitoring. A relatively small quantity of datum stations needs to be deployed, and investment may be increased to select a better environment to construct the NRTK/CORS system. However, the entire datum station/reference station network may need to be networked and reconstructed because of a change (for example, a fault) in a single datum station. If a reliability mechanism (for example, backup) is added to a single datum station, higher construction and maintenance costs are brought.

As application of the NRTK/CORS system is extended to industries such as intelligent transportation and auto control, and a larger quantity of datum stations needs to be deployed. If the NRTK/CORS system is deployed together with infrastructure (for example, a base station) of the communications network to reduce costs, a more complex and harsh environment may be faced. Therefore, a change in a single datum station may only result in networking reconstruction of a part of the datum station/reference station network. However, a probability of this dynamic change is extremely high.

Application such as self-driving requires uninterrupted high-precision positioning from the NRTK/CORS system. However, the networking reconstruction of the datum station/reference station network in the system may interrupt a positioning service provided by the system. Therefore, a solution that can effectively reduce impact of the networking reconstruction on the service needs to be established.

SUMMARY

Embodiments of the present disclosure provide a virtual reference station switching method and device in a real time kinematic system to effectively reduce impact of networking reconstruction of a reference station network in the real time kinematic system on a positioning service provided by the real time kinematic system, and meet a requirement for uninterrupted high-precision positioning. According to the embodiments of the present disclosure, in an NRTK/CORS system, any three datum stations/reference stations A, B, and C may form a triangular area. A central station O calculates GNSS measurement data of a virtual reference station V based on GNSS measurement data of the three datum stations/reference stations. The GNSS measurement data of the virtual reference station V may be used to correct GNSS measurement data of a mobile station M in the triangular area to implement high-precision positioning of the mobile station M. Based on the datum station/reference station network, if position information of a mobile station is known, the central station may select three optimal datum stations/reference stations for the mobile station, to obtain a virtual reference station. For example, the mobile station is located in a pre-divided datum station/reference station triangular area, and therefore three datum stations/reference stations that form the triangular area are selected, or three datum stations/reference stations that have shortest distances from the mobile station are selected based on a distance between the mobile station and each datum station/reference station.

In the embodiments of the present disclosure, based on the position information of the mobile station, the central station predicts possible impact of networking reconstruction of the datum station/reference station network on the positioning service provided by the datum station/reference station network for the mobile station, whether a datum station used to calculate the virtual reference station is switched. If the central station predicts that the datum station used by the central station to calculate the virtual reference station for the mobile station is switched because of networking reconstruction, the central station simultaneously calculates, respectively based on datum stations that are before and after switching, virtual reference stations before and after switching and GNSS measurement data of the virtual reference stations before and after switching. Alternatively, the central station separately provides, to the mobile station before and after networking reconstruction, GNSS measurement data of virtual reference stations before and after switching, or simultaneously provides GNSS measurement data of virtual reference stations before and after switching such that the mobile station independently selects, based on a position of the mobile station, GNSS measurement data for use.

Based on the datum station/reference station network, if position information of a mobile station is known, the central station may select three optimal datum stations/ reference stations for the mobile station, to obtain a virtual reference station. For example, the mobile station is located in a divided datum station/reference station triangular area in the datum station/reference station network, and therefore three datum stations/reference stations that form the triangular area are selected, or three datum stations/reference stations that have shortest distances from the mobile station are selected based on a distance between the mobile station and each datum station/reference station in the datum station/reference station network.

According to a first aspect, a virtual reference station switching method in a real time kinematic system is provided, and the method is usually completed by a central station in the system. The method includes obtaining networking change information of a reference station network, obtaining prediction information based on the networking change information of the reference station network, where the prediction information includes a reference station combination used to calculate a virtual reference station of a mobile station is switched from a first reference station combination to a second reference station combination, obtaining a first virtual reference station through calculation based on the first reference station combination, obtaining a second virtual reference station through calculation based on the second reference station combination, and obtaining first virtual reference station information and second virtual reference station information, and providing at least one of the first virtual reference station information and the second virtual reference station information to the mobile station such that positioning correction is performed on the mobile station. In the method, a reference station combination can be switched based on a networking change in the network, and a new virtual reference station is determined to effectively reduce impact of networking reconstruction of the reference station network in the real time kinematic system on a positioning service provided by the real time kinematic system.

In various proper embodiments, in an implementation, the networking change that is in the reference station network and that is caused when at least one reference station exits from the reference station network or joins the reference station network may be predicted.

In various proper embodiments, in an implementation, position information of the mobile station may be obtained, and a reference station combination used to calculate the virtual reference station for the mobile station is determined based on the position information of the mobile station.

In various proper embodiments, an implementation of a process in which the reference station combination used to calculate the virtual reference station for the mobile station is determined based on the position information of the mobile station may include obtaining reference station triangular area division information of the reference station network, determining, based on the position information of the mobile station and the reference station triangular area division information, a reference station triangular area in which the mobile station is located, and selecting, as the reference station combination, three reference stations that form the reference station triangular area.

Another implementation of a process in which the reference station combination used to calculate the virtual reference station for the mobile station is determined based on the position information of the mobile station may include obtaining each piece of reference station distribution information of the reference station network, determining, based on the position information of the mobile station and the reference station distribution information, a distance between the mobile station and each reference station in the reference station network, and selecting, as the reference station combination, three reference stations that have shortest distances from the mobile station.

In various proper embodiments, a possible implementation of the providing at least one of the first virtual reference station information and the second virtual reference station information to the mobile station includes, before the reference station combination used to calculate the virtual reference station of the mobile station is switched from the first reference station combination to the second reference station combination, virtual reference station information includes measurement data of the first virtual reference station, and after the reference station combination used to calculate the virtual reference station of the mobile station is switched from the first reference station combination to the second reference station combination, virtual reference station information includes measurement data of the second virtual reference station.

In an implementation, virtual reference station information includes measurement data of the first virtual reference station and measurement data of the second virtual reference station.

According to a second aspect, a virtual reference station switching method in a real time kinematic system is provided, and this method is usually implemented by a mobile station. The method includes obtaining virtual reference station information, where the virtual reference station information is obtained by a central station through calculation based on a reference station combination, the reference station combination includes a first reference station combination and a second reference station combination, and the central station determines, based on networking change information of a reference station network, that the reference station combination is switched from the first reference station combination to the second reference station combination, and performing positioning correction based on the virtual reference station information.

In various proper embodiments, a specific implementation of obtaining virtual reference station information includes, before the reference station combination is switched from the first reference station combination to the second reference station combination, the virtual reference station information includes measurement data of a first virtual reference station, and the first virtual reference station is obtained by the central station through calculation based on the first reference station combination, and after the reference station combination is switched from the first reference station combination to the second reference station combination, the virtual reference station information includes measurement data of a second virtual reference station, and the second virtual reference station is obtained by the central station through calculation based on the second reference station combination.

In various proper embodiments, another specific implementation of obtaining virtual reference station information includes the virtual reference station information includes measurement data of a first virtual reference station and measurement data of a second virtual reference station, the first virtual reference station is obtained by the central station through calculation based on the first reference station combination, and the second virtual reference station is obtained by the central station through calculation based on the second reference station combination.

In various proper embodiments, an implementation of the performing positioning correction based on the virtual reference station information includes obtaining position information of the mobile station, and selecting, based on the position information of the mobile station, the measurement data of the first virtual reference station or the measurement data of the second virtual reference station for positioning correction.

In an implementation, the selecting, based on the position information of the mobile station, the measurement data of the first virtual reference station or the measurement data of the second virtual reference station for positioning correction in the second aspect includes obtaining reference station triangular area division information of the reference station network, determining, based on the position information of the mobile station and the reference station triangular area division information, a reference station triangular area in which the mobile station is located, and selecting, as a reference station combination, three reference stations that form the reference station triangular area, and obtaining measurement data of a virtual reference station through calculation.

In an implementation, the selecting, based on the position information of the mobile station, the measurement data of the first virtual reference station or the measurement data of the second virtual reference station for positioning correction in the second aspect includes obtaining each piece of reference station distribution information of the reference station network, determining, based on the position information of the mobile station and the reference station distribution information, a distance between the mobile station and each reference station in the reference station network, and selecting, as the reference station combination, three reference stations that have shortest distances from the mobile station, and obtaining measurement data of a virtual reference station through calculation.

According to a third aspect, a virtual reference station switching device in a real time kinematic system is provided, and the device is usually a central station in the system or a functional entity integrated into a central station. The device includes a processor that has calculation and processing capabilities, a memory that stores data or a program and that cooperates with the processor, and a communications circuit that communicates with another device. The processor is configured to obtain networking change information of a reference station network, obtain prediction information based on the networking change information of the reference station network, where the prediction information includes a reference station combination used to calculate a virtual reference station of a mobile station is switched from a first reference station combination to a second reference station combination, and obtain a first virtual reference station through calculation based on the first reference station combination, obtain a second virtual reference station through calculation based on the second reference station combination, and obtain first virtual reference station information and second virtual reference station information. The communications circuit is configured to provide at least one of the first virtual reference station information and the second virtual reference station information to the mobile station such that positioning correction is performed on the mobile station.

The virtual reference station switching device in the real time kinematic system may implement the virtual reference station switching method in the real time kinematic system in the first aspect, that is, various specific implementations. In a possible implementation, the communications circuit obtains position information of the mobile station. The position information of the mobile station may be, for example, position information sent by the mobile station, or may be position information that is of the mobile station and that is detected by the processor by using a sensing device, or the like. The processor has the calculation and processing capabilities, and can complete and execute the steps or functions required in the virtual reference station switching method in the real time kinematic system in the first aspect.

According to a fourth aspect, a mobile station device in a real time kinematic system is provided, and the device includes a processor that has a processing capability, a receiver that receives information sent by another device, a transmitter that sends information, and a position sensor that obtains or determines a position of the device. In a typical entirety implementation, the receiver is configured to receive virtual reference station information provided by a central station, where the virtual reference station is obtained by the central station through calculation based on a reference station combination, the reference station combination includes a first reference station combination or a second reference station combination, and the central station determines, based on networking change prediction information of a reference station network, that the first reference station combination is switched to the second reference station combination, and a processor is configured to perform positioning correction based on the virtual reference station information.

In a possible specific implementation, in various proper embodiments, the receiver receives the virtual reference station information provided by the central station. Before the reference station combination is switched from the first reference station combination to the second reference station combination, the virtual reference station information includes measurement data of a first virtual reference station, and the first virtual reference station is obtained by the central station through calculation based on the first reference station combination, and after the reference station combination is switched from the first reference station combination to the second reference station combination, the virtual reference station information includes measurement data of a second virtual reference station, and the second virtual reference station is obtained by the central station through calculation based on the second reference station combination.

In a possible implementation, the receiver receives the virtual reference station information, where the virtual reference station is obtained by the central station through calculation based on the reference station combination, and the central station determines, based on the networking change prediction information of the reference station network, that the reference station combination is switched from the first reference station combination to the second reference station combination.

The virtual reference station information includes measurement data of a first virtual reference station and measurement data of a second virtual reference station, the first virtual reference station is obtained by the central station through calculation based on the first reference station combination, and the second virtual reference station is obtained by the central station through calculation based on the second reference station combination.

In a possible implementation, the position sensor obtains position information of the mobile station, and the processor may select the measurement data of the first virtual reference station or the measurement data of the second virtual reference station based on the position information of the mobile station to perform positioning correction.

The processor of the mobile station device in the real time kinematic system has calculation and processing capabilities, and can complete and execute the steps or functions required in the virtual reference station switching method in the real time kinematic system in the first aspect.

These aspects or other aspects of the present disclosure are more concise and comprehensible in descriptions of the following embodiments.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure.

It should be understood that the embodiments of the present disclosure may be applied to any mobile station in a real time kinematic system. The mobile station may be placed on a vehicle, or may be a functional entity of a vehicle, and the vehicle is merely a typical type of the mobile stations that features a high moving speed. For ease of description, when the vehicle is used as an example to describe the present disclosure, the mobile station may be placed in another device or may be a part of another device entity with mobility. The mobile station in the embodiments of the present disclosure may be used in various scenarios, product devices, or entities that require positioning.

The embodiments of the present disclosure may be applied to any reference station in the real time kinematic system. A datum station is merely a typical type of the reference stations that features permanent and continuous running. For ease of description, when the datum station is used as an example to describe the present disclosure, no limitation is imposed on an applicable reference station.

Figure 1:
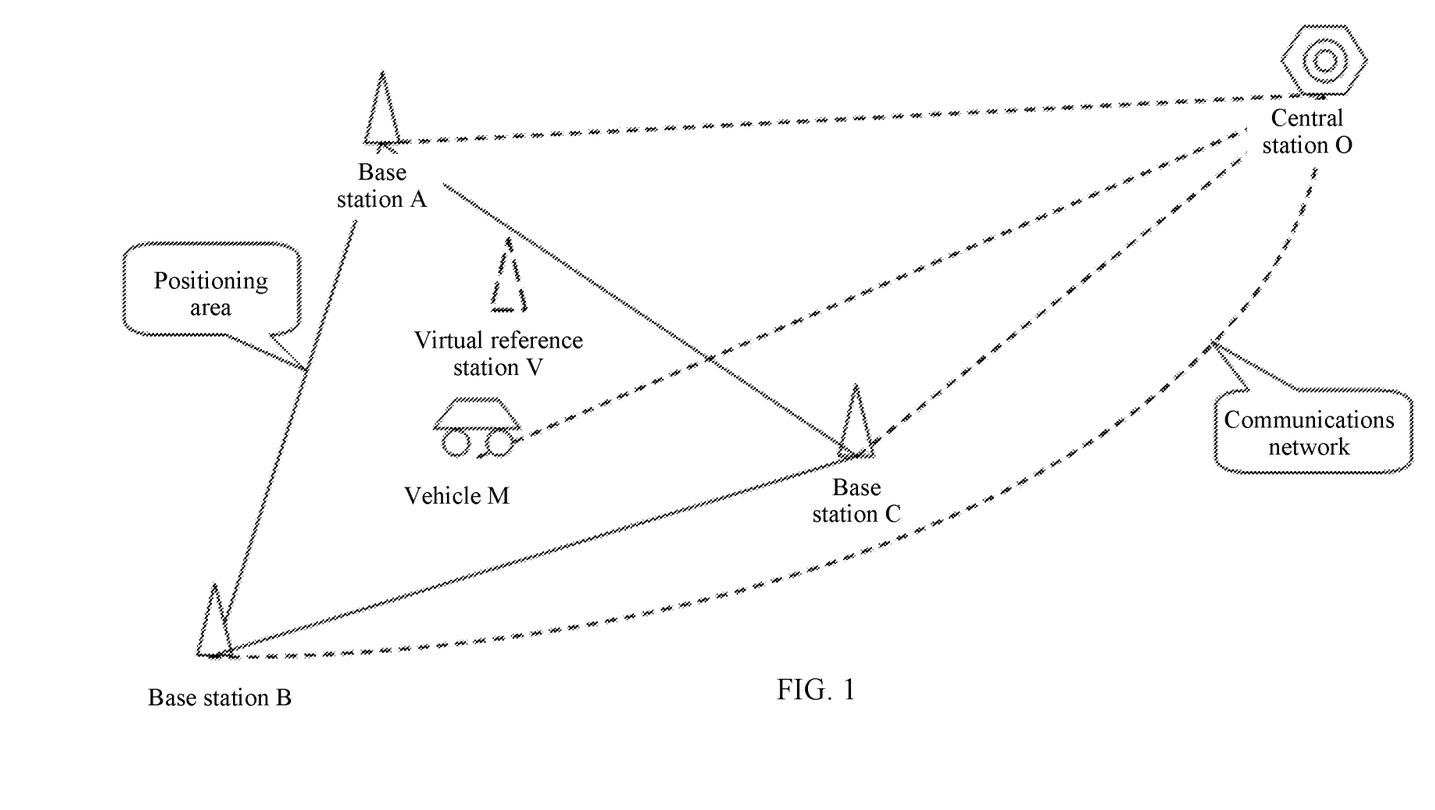
FIG. 1 is a schematic composition diagram of a real time kinematic system according to an embodiment of the present disclosure.

FIG. 1 is a schematic composition diagram of a real time kinematic system according to an embodiment of the present disclosure.

As shown in FIG. 1, in an NRTK/CORS system, any three datum stations/reference stations may form a triangular area. A central station calculates real-time GNSS measurement data of a virtual reference station based on real-time GNSS measurement data of the three datum stations/reference stations. The real-time GNSS measurement data of the virtual reference station may be used to correct real-time GNSS measurement data of a mobile station (for example, a vehicle) in the triangular area to implement real-time high-precision positioning of the mobile station.

Based on a datum station/reference station network, if position information of the mobile station is known, the central station may select three optimal datum stations/reference stations for the mobile station to obtain a virtual reference station. For example, the mobile station is located in a divided datum station/reference station triangular area in the datum station/reference station network, and therefore three datum stations/reference stations that form the triangular area are selected, or three datum stations/reference stations that have shortest distances from the mobile station are selected based on a distance between the mobile station and each datum station/reference station in the datum station/reference station network.

Figure 2:
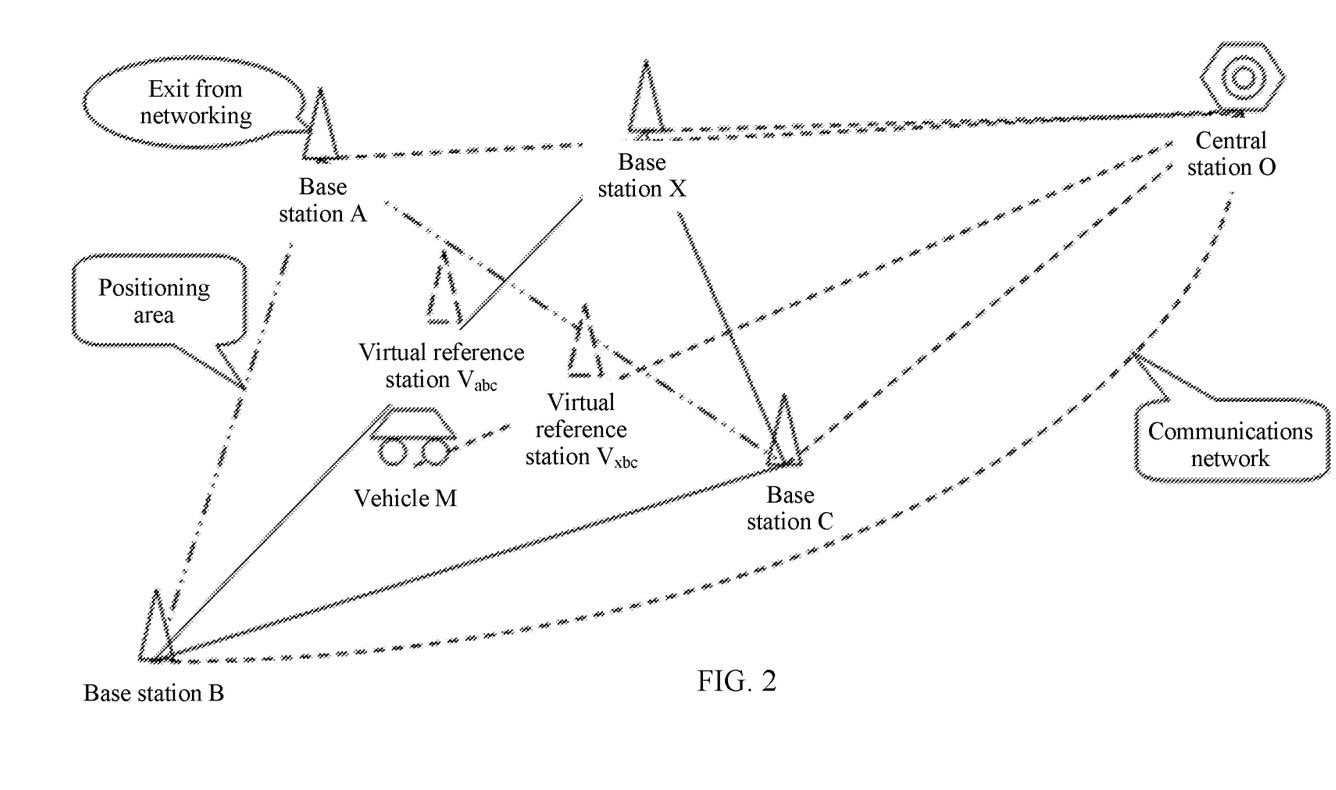
FIG. 2 is a schematic diagram of a virtual reference station switching method when a datum station exits from a network according to an embodiment of the present disclosure.

FIG. 2 is a schematic diagram of a virtual reference station switching method when a datum station exits from a network according to an embodiment of the present disclosure.

As shown in FIG. 2, it is assumed that a vehicle M is used as a mobile station, and positioning correction is currently performed by using a virtual reference station $V_{abc}$ obtained by a central station O through calculation based on datum stations A, B, and C. If one of the datum stations A, B, and C exits from the datum station/reference station network (for example, is disabled or faulty), networking of the datum station/reference station network is reconstructed. The central station O may predict impact of the networking reconstruction on a positioning service provided by an NRTK/CORS system for the vehicle M.

If the central station O predicts that when the datum station A exits, positioning correction is provided for the vehicle M by using a virtual reference station $V_{xbc}$ obtained by the central station O through calculation based on datum stations X, B, and C, before the datum station A exits, the central station O may simultaneously calculate the virtual reference station $V_{abc}$ based on the datum stations A, B, and C, and calculate the virtual reference station $V_{xbc}$ based on the datum stations X, B, and C. The central station O may perform such prediction for any datum station before the datum station actually exits from the network.

Before the datum station A exits, if the networking is not changed, the central station O provides GNSS measurement data of $V_{abc}$ to the vehicle M, to perform positioning correction on the vehicle M. After the datum station A exits, if the networking is reconstructed, the central station O provides GNSS measurement data of $V_{xbc}$ to the vehicle M, to perform positioning correction on the vehicle M. Because $V_{abc}$ and $V_{xbc}$ are simultaneously prepared, the networking reconstruction does not cause interruption of the positioning service. If the GNSS measurement data of $V_{abc}$ has been sent to the vehicle M previously or the vehicle M has obtained the GNSS measurement data of $V_{abc}$, when current exit of the datum station A results in a networking change, the central station O may currently provide only the GNSS measurement data of $V_{xbc}$ to the vehicle M.

The central station O may select the datum stations X, B, and C based on position information of the vehicle M, to calculate the virtual reference station $V_{xbc}$ in advance for the vehicle M. For example, the central station O may select the datum stations X, B, and C because after the datum station A exits, the vehicle M is located in a redivided triangular area that includes the datum stations X, B, and C, or select, based on distances between the vehicle M and all other datum stations after the datum station A exits, three datum stations X, B, and C that have shortest distances from the vehicle M.

Figure 3:
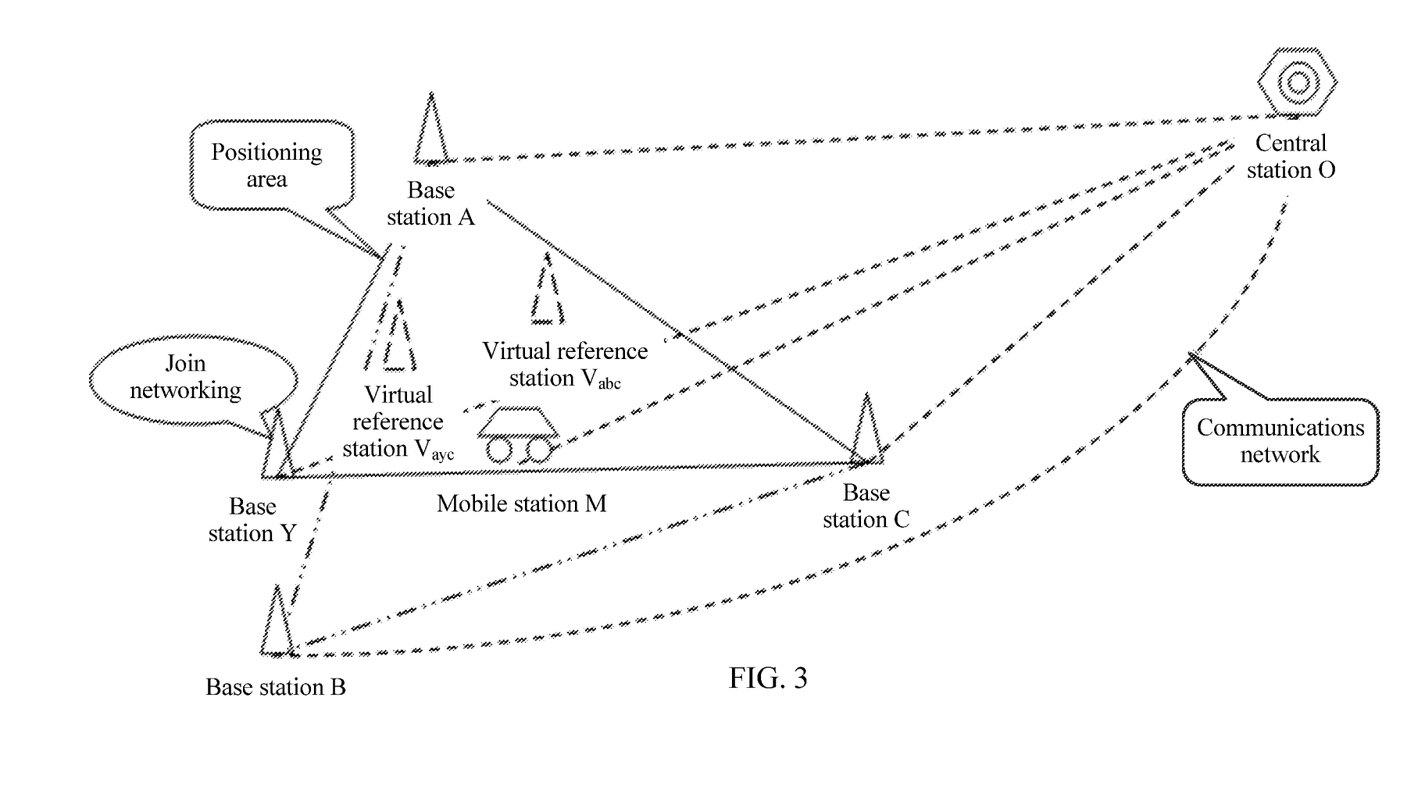
FIG. 3 is a schematic diagram of a virtual reference station switching method when a datum station joins a network according to an embodiment of the present disclosure.

FIG. 3 is a schematic diagram of a virtual reference station switching method when a datum station joins a network according to an embodiment of the present disclosure.

As shown in FIG. 3, it is assumed that a vehicle M is used as a mobile station, and positioning correction is currently performed by using a virtual reference station $V_{abc}$ obtained by a central station O through calculation based on datum stations A, B, and C. If a datum station Y near the datum stations A, B, and C is added to (for example, is enabled or restored) a datum station/reference station network, networking of the datum station/reference station network is reconstructed. The central station O may predict impact of the networking reconstruction on a positioning service provided by an NRTK/CORS system for the vehicle M.

If the central station O predicts that when the datum station Y is added, positioning correction is provided for the vehicle M by using a virtual reference station $V_{ayc}$ obtained by the central station O through calculation based on datum stations A, Y, and C, after the datum station Y is added, the central station O may simultaneously calculate the virtual reference station $V_{abc}$ based on the datum stations A, B, and C, and calculate the virtual reference station $V_{ayc}$ based on the datum stations A, Y, and C. The central station O may perform such prediction for any datum station before the datum station actually joins the network.

Before the datum station Y is introduced, if the networking is not changed, the central station O provides GNSS measurement data of $V_{abc}$ to the vehicle M, to perform positioning correction on the vehicle M. After the datum station Y is introduced, if the networking is reconstructed, the central station O provides GNSS measurement data of $V_{ayc}$ to the vehicle M, to perform positioning correction on the vehicle M. Because $V_{abc}$ and $V_{ayc}$ are simultaneously prepared, the networking reconstruction does not cause interruption of the positioning service.

The central station O may select the datum stations A, Y, and C based on position information of the vehicle M, to calculate the virtual reference station $V_{ayc}$ in advance for the vehicle M. For example, the central station O may select the datum stations A, Y, and C because after the datum station Y is introduced, the vehicle M is located in a redivided triangular area that includes the datum stations A, Y, and C, or select, based on distances between the vehicle M and all other datum stations after the datum station Y is introduced, three datum stations A, Y, and C that have shortest distances from the vehicle M.

Based on the principle of the foregoing solution, assuming that the central station O predicts, based on the position information of the vehicle M, that if the networking of the datum station/reference station network is reconstructed, datum stations used by the central station O to calculate a virtual reference station for the vehicle M are switched from A, B, and C to A, B, and Z, the central station O simultaneously calculates the virtual reference station $V_{abc}$ based on the datum stations A, B, and C, and calculates a virtual reference station $V_{abz}$ based on the datum stations A, B, and Z.

The central station O may provide GNSS measurement data of $V_{abc}$ or GNSS measurement data of $V_{abz}$ for the vehicle M, or simultaneously provide GNSS measurement data of $V_{abc}$ and GNSS measurement data of $V_{abz}$ for the vehicle M such that the vehicle M independently selects GNSS measurement data for use.

When the networking of the datum station/reference station network is actually reconstructed, and the datum stations used to calculate the virtual reference station for the vehicle M are switched from A, B, and C to A, B, and Z, GNSS measurement data used to perform positioning correction on the vehicle M is switched from the GNSS measurement data of $V_{abc}$ to the GNSS measurement data of $V_{abz}$.

The vehicle M may determine, based on the position information of the vehicle M and a networking change situation of the datum station/reference station network, that the datum stations used to calculate the virtual reference station for the vehicle M are switched from A, B, and C to A, B, and Z. For example, the vehicle M may determine, based on different triangular area divisions before and after networking reconstruction of the datum station/reference station network, that the vehicle M switches a triangular area of A, B, and C to a triangular area of A, B, and Z, or may determine, based on a distance between the vehicle M and each datum station, that three datum stations that have shortest distances from the vehicle M are switched from A, B, and C to A, B, and Z.

Figure 4A:
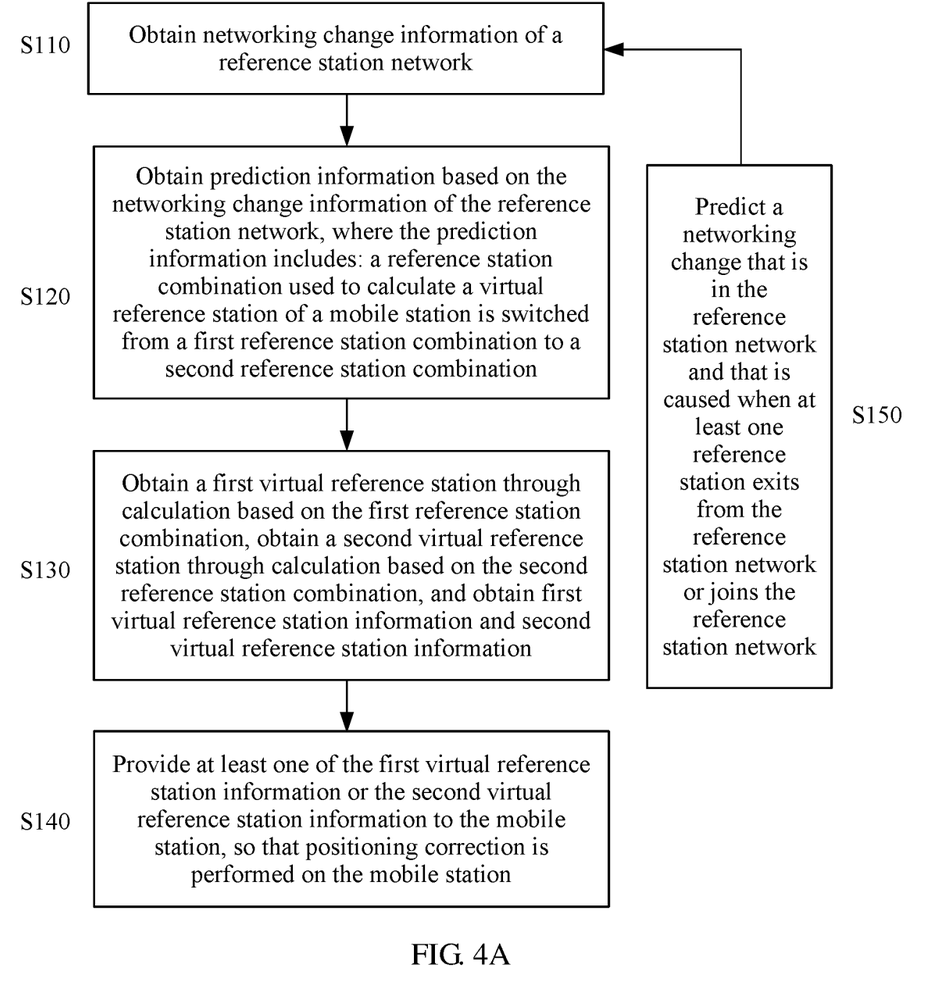
FIGS. 4A and 4B are schematic diagrams of a central-station side procedure of a virtual reference station switching method in a real time kinematic system according to an embodiment of the present disclosure.
Figure 4B:
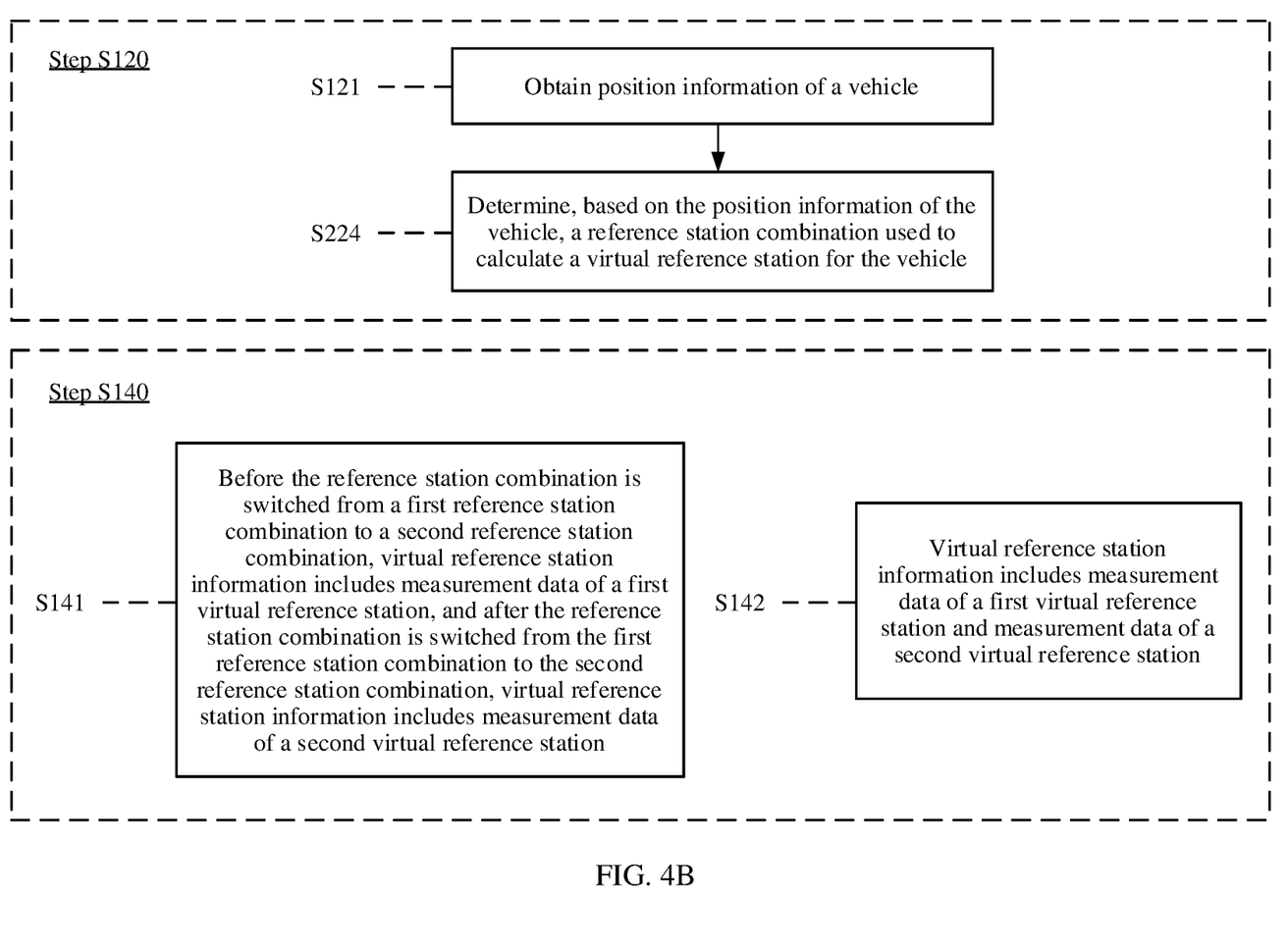

FIG. 4 is schematic diagrams of a central-station side procedure of a virtual reference station switching method in a real time kinematic system according to an embodiment of the present disclosure. As shown in FIG. 4, the method includes the following steps.

S110. Obtain networking change information of a reference station network.

S120. Obtain prediction information based on the networking change information of the reference station network, where the prediction information includes a reference station combination used to calculate a virtual reference station of a mobile station is switched from a first reference station combination to a second reference station combination.

S130. Obtain a first virtual reference station through calculation based on the first reference station combination, obtain a second virtual reference station through calculation based on the second reference station combination, and obtain first virtual reference station information and second virtual reference station information.

S140. Provide at least one of the first virtual reference station information and the second virtual reference station information to the mobile station such that positioning correction is performed on the mobile station. In various specific embodiments, in a possible implementation, both the first virtual reference station information and the second virtual reference station information are provided for the mobile station. In other cases, only one of the first virtual reference station information or the second virtual reference station information needs to be provided. For example, the mobile station already has the first virtual reference station information. When networking is changed, only the second virtual reference station information needs to be provided, and this solution may be implemented.

Further, in another more specific implementation of this embodiment of the present disclosure, the method may further optionally include the following steps.

S150. Predict a networking change that is in the reference station network and that is caused when at least one reference station exits from the reference station network or joins the reference station network to obtain the networking change information of the reference station network.

Step S120 of the method further includes the following steps.

S121. Obtain position information of the vehicle (that is, the mobile station).

S122. Determine, based on the position information of the vehicle, a reference station combination used to calculate the virtual reference station for the vehicle.

Step S140 of the method further includes the following steps.

S141. Before the reference station combination is switched from the first reference station combination to the second reference station combination, virtual reference station information includes measurement data of the first virtual reference station, and after the reference station combination is switched from the first reference station combination to the second reference station combination, virtual reference station information includes measurement data of the second virtual reference station. In the alternative, step S142 may be performed.

S142. Virtual reference station information includes measurement data of the first virtual reference station and measurement data of the second virtual reference station.

Figure 5:
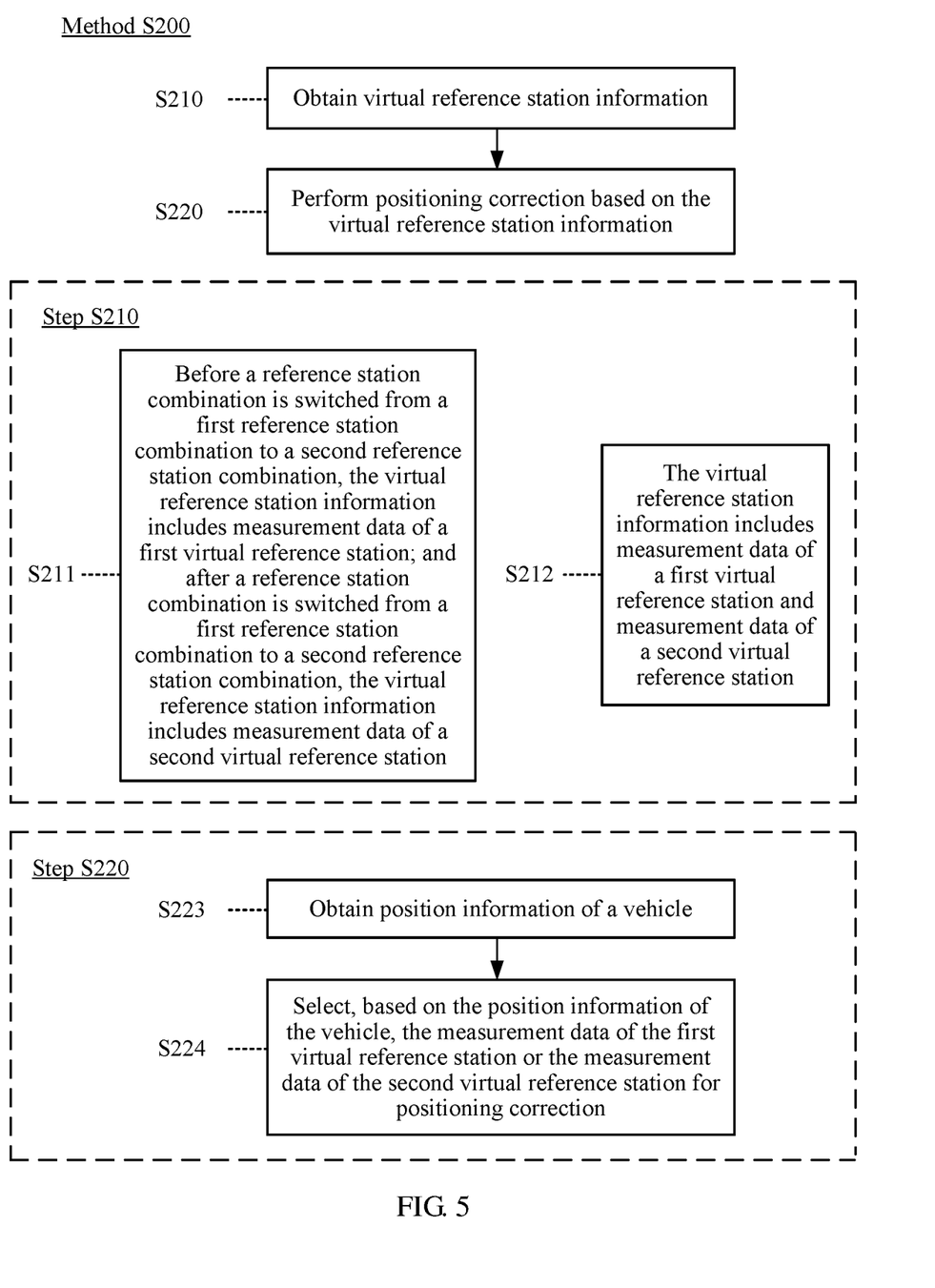
FIG. 5 is schematic diagrams of a vehicle side procedure of a virtual reference station switching method in a real time kinematic system according to an embodiment of the present disclosure.

FIG. 5 is schematic diagrams of a procedure that is completed on a vehicle side (or a mobile station) and that is of a virtual reference station switching method in a real time kinematic system according to an embodiment of the present disclosure.

As shown in FIG. 5, the method S200 includes the following steps.

S210. Obtain virtual reference station information, where the virtual reference station is obtained by a central station through calculation based on a reference station combination, and the central station determines, based on networking change information of a reference station network, that the reference station combination is switched from a first reference station combination to a second reference station combination.

S220. Perform positioning correction based on the virtual reference station information.

Step S210 of the method S200 further includes the following steps.

S211. Before the reference station combination is switched from the first reference station combination to the second reference station combination, the virtual reference station information includes measurement data of a first virtual reference station, and the first virtual reference station is obtained by the central station through calculation based on the first reference station combination, and after the reference station combination is switched from the first reference station combination to the second reference station combination, the virtual reference station information includes measurement data of a second virtual reference station, and the second virtual reference station is obtained by the central station through calculation based on the second reference station combination. Step S212 may be performed in the alternative.

S212. The virtual reference station information includes measurement data of a first virtual reference station and measurement data of a second virtual reference station, the first virtual reference station is obtained by the central station through calculation based on the first reference station combination, and the second virtual reference station is obtained by the central station through calculation based on the second reference station combination.

After step S212 of the method S200, step 220 further includes the following steps.

S223. Obtain position information of a vehicle, in other words, position information of the mobile station.

S224. Select, based on the position information of the vehicle, the measurement data of the first virtual reference station or the measurement data of the second virtual reference station for positioning correction.

In a specific embodiment, with reference to different actual situations in various embodiments, if the central station already knows the position information of the mobile station, or the central station has selected required measurement data for the mobile station, the central station may directly select one of the measurement data of the first virtual reference station or the measurement data of the second virtual reference station, and send the selected measurement data to the vehicle (the mobile station). This implementation may be combined with various implementations or applied to various proper implementations.

Figure 6:
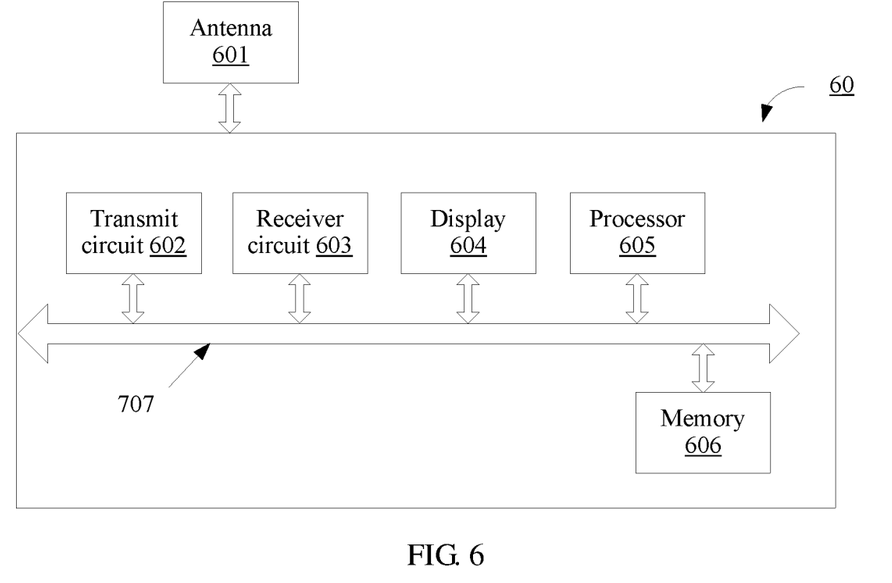
FIG. 6 is schematic diagrams of central-station side modules of a virtual reference station switching device in a real time kinematic system according to an embodiment of the present disclosure.

FIG. 6 is schematic diagrams of central-station side modules of a virtual reference station switching device in a real time kinematic system according to an embodiment of the present disclosure. The device 60 includes a processor 605 that has calculation and processing capabilities, a memory 606 that stores data or a program and that cooperates with the processor, and a communications circuit that communicates with another device, including a transmit circuit 602 and a receiver circuit 603, and may perform wireless communication with another device by using an antenna 601. Optionally, a display 604 may be included. The display is not mandatory, may be set based on a requirement, and is configured to display related information or human-machine interaction information. Each module is connected to the processor 605 by using a bus 707, and is managed by the processor 605. The processor has the calculation and processing capabilities, and can complete and execute the steps or functions required in the virtual reference station switching method performed by the central station in the real time kinematic system.

As shown in FIG. 6, the device 60 includes the following components.

The processor 605 is configured to obtain networking change information of a reference station network, obtain prediction information based on the networking change information of the reference station network, where the prediction information includes a reference station combination used to calculate a virtual reference station of a mobile station is switched from a first reference station combination to a second reference station combination, and obtain a first virtual reference station through calculation based on the first reference station combination, obtain a second virtual reference station through calculation based on the second reference station combination, and obtain first virtual reference station information and second virtual reference station information.

The communications circuit is configured to provide at least one of the first virtual reference station information and the second virtual reference station information to the mobile station such that positioning correction is performed on the mobile station. The communications circuit sends virtual reference station information to a vehicle, and positioning correction is performed on the vehicle based on the virtual reference station information.

Because a reference station may change in actual application, the processor 605 may predict a networking change that is in the reference station network and that is caused when at least one reference station exits from the reference station network or joins the reference station network. The communications circuit may further obtain position information of the vehicle (the mobile station). The processor 605 determines, based on the position information of the vehicle, a reference station combination used to calculate the virtual reference station for the vehicle. Alternatively, the processor may directly obtain, by using a sensor of the central station, the position information sent by the vehicle (the mobile station). The processor determines that virtual reference station information includes measurement data of the first virtual reference station before the reference station combination used to calculate the virtual reference station of the vehicle is switched from the first reference station combination to the second reference station combination, and the processor determines that the virtual reference station information includes measurement data of the second virtual reference station after the reference station combination used to calculate the virtual reference station of the vehicle is switched from the first reference station combination to the second reference station combination. Alternatively, the processor determines that the virtual reference station information includes measurement data of the first virtual reference station and measurement data of the second virtual reference station.

Figure 7:
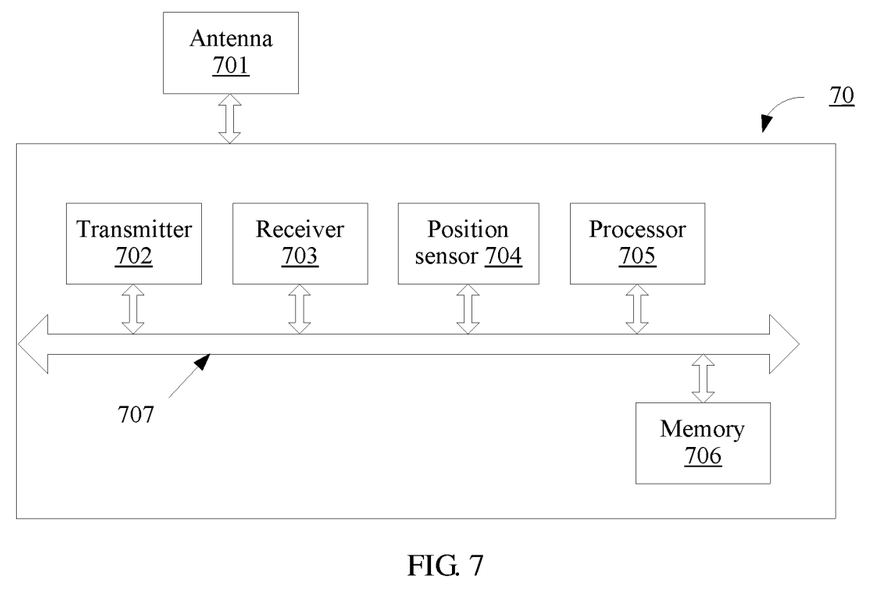
FIG. 7 is schematic diagrams of vehicle side modules of a virtual reference station switching device in a real time kinematic system according to an embodiment of the present disclosure.

FIG. 7 is a schematic diagram of vehicle side modules of a virtual reference station switching device in a real time kinematic system according to an embodiment of the present disclosure. Usually, the device is a mobile station in the real time kinematic system. The mobile station may be a separate module device, or may be an entity in another apparatus, for example, a vehicle. An entity that may have the function or a vehicle that integrates the module device is considered as a mobile station. The device 70 includes a processor 705 that has a processing capability, a receiver 703 that receives information sent by another device, a transmitter 702 that sends information, a position sensor 704 that obtains or determines a position of the device, a memory 706 that is configured to store, for example, information, data, or a program, and the like. The receiver 703 and the transmitter 702 may perform wireless communication with another device by using an antenna 701. A display may be further added based on a requirement (not shown in the figure). A processor 705 of a mobile station device in the real time kinematic system has calculation and processing capabilities, and can complete and execute, or jointly manage other components to complete and execute the steps or functions required in the virtual reference station switching method performed by the vehicle (the mobile station) in the real time kinematic system. The receiver 703 is configured to receive virtual reference station information provided by a central station, where the virtual reference station is obtained by the central station through calculation based on a reference station combination, the reference station combination includes a first reference station combination or a second reference station combination, and the central station determines, based on networking change prediction information of a reference station network, that the first reference station combination is switched to the second reference station combination, and a processor 705 is configured to perform positioning correction based on the virtual reference station information.

Further, before the reference station combination is switched from the first reference station combination to the second reference station combination, the virtual reference station information includes measurement data of a first virtual reference station, and the first virtual reference station is obtained by the central station through calculation based on the first reference station combination, and after the reference station combination is switched from the first reference station combination to the second reference station combination, the virtual reference station information includes measurement data of a second virtual reference station, and the second virtual reference station is obtained by the central station through calculation based on the second reference station combination.

Alternatively, the virtual reference station information includes measurement data of a first virtual reference station and measurement data of a second virtual reference station, the first virtual reference station is obtained by the central station through calculation based on the first reference station combination, and the second virtual reference station is obtained by the central station through calculation based on the second reference station combination.

The position sensor 704 is configured to obtain position information of the vehicle. The sensor may independently perform positioning and sensing, or receive, for example, a signal of a GPS system to obtain the position information of the vehicle.

After the position information is obtained, the processor obtains the position information. The processor selects, based on the position information of the vehicle, the measurement data of the first virtual reference station or the measurement data of the second virtual reference station for positioning correction.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one place, or may be distributed on a plurality of network units. Some or all of the units may be selected based on actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that may store program code, such as a universal serial bus (USB) flash drive, a removable hard disk, a read-only memory (ROM), a random access memory (RAM), a magnetic disk, or an optical disc.

What is claimed is:

1. A virtual reference station switching method in a real time kinematic system, comprising:
    obtaining networking change information of a reference station network;
    obtaining prediction information based on the networking change information of the reference station network, wherein the prediction information comprises a reference station combination used to calculate a virtual reference station of a mobile station that is switched from a first reference station combination to a second reference station combination;
    obtaining a first virtual reference station based on the first reference station combination;
    obtaining a second virtual reference station based on the second reference station combination;
    obtaining first virtual reference station information and second virtual reference station information; and
    providing at least one of the first virtual reference station information or the second virtual reference station information to the mobile station to perform positioning correction on the mobile station.

2. The virtual reference station switching method of claim 1, wherein before obtaining the networking change information of the reference station network, the method further comprises:
    predicting a networking change in the reference station network caused in response to at least one reference station exiting the reference station network or joining the reference station network to obtain a prediction result; and
    obtaining the networking change information of the reference station network based on the prediction result.

3. The virtual reference station switching method of claim 1, further comprising:
    obtaining reference station triangular area division information in networking of the reference station network;
    determining a reference station triangular area in which the mobile station is located based on position information of the mobile station and the reference station triangular area division information; and
    selecting three reference stations that form the reference station triangular area as the second reference station combination.

4. The virtual reference station switching method of claim 1, further comprising:
    obtaining reference station distribution information in networking of the reference station network for each reference station in the reference station network;
    determining a distance between the mobile station and each reference station in the reference station network based on position information of the mobile station and the reference station distribution information; and
    selecting three reference stations that have shortest distances from the mobile station as the second reference station combination.

5. The virtual reference station switching method of claim 1, wherein providing at least one of the first virtual reference station information and the second virtual reference station information to the mobile station to perform positioning correction on the mobile station comprises:

providing the first virtual reference station information to the mobile station before the reference station combination used to calculate the virtual reference station of the mobile station is switched from the first reference station combination to the second reference station combination, wherein the first virtual reference station information comprises measurement data of the first virtual reference station; and providing the second virtual reference station information to the mobile station after the reference station combination used to calculate the virtual reference station of the mobile station is switched from the first reference station combination to the second reference station combination, wherein the second virtual reference station information comprises measurement data of the second virtual reference station.

6. A virtual reference station switching device in a real time kinematic system, comprising:
   a memory configured to store instructions; and
   a processor coupled to the memory and configured to execute the instructions, which cause the processor to be configured to:
      obtain networking change information of a reference station network;
      obtain prediction information based on the networking change information of the reference station network, wherein the prediction information comprises a reference station combination used to calculate a virtual reference station of a mobile station that is switched from a first reference station combination to a second reference station combination;
      obtain a first virtual reference station based on the first reference station combination;
      obtain a second virtual reference station based on the second reference station combination;
      obtain first virtual reference station information and second virtual reference station information; and
      provide at least one of the first virtual reference station information or the second virtual reference station information to the mobile station to positioning correction on the mobile station.

7. The virtual reference station switching device of claim 6, wherein the instructions further cause the processor to be configured to:
   predict a networking change in the reference station network caused in response to at least one reference station exiting from the reference station network or joining the reference station network; and
   obtain the networking change information of the reference station network.

8. The virtual reference station switching device of claim 7, wherein the instructions further cause the processor to be configured to:
   obtain position information of the mobile station; and
   determine the first reference station combination and the second reference station combination based on the position information of the mobile station.

9. The virtual reference station switching device of claim 8, wherein the instructions further cause the processor to be configured to:
   obtain reference station triangular area division information in networking of the reference station network;
   determine a reference station triangular area in which the mobile station is located based on the position information of the mobile station and the reference station triangular area division information; and
   select three reference stations that form the reference station triangular area as the second reference station combination.

10. The virtual reference station switching device of claim 8, wherein the instructions further cause the processor to be configured to:
    obtain reference station distribution information of the reference station network for each reference station in the reference station network;
    determine a distance between the mobile station and each reference station in the reference station network based on the position information of the mobile station and the reference station distribution information; and
    select three reference stations that have shortest distances from the mobile station as the second reference station combination.

11. The virtual reference station switching device of claim 6, wherein the instructions further cause the processor to be configured to:
    determine that virtual reference station information comprises measurement data of the first virtual reference station before the reference station combination used to calculate the virtual reference station of the mobile station is switched from the first reference station combination to the second reference station combination; and
    determine that virtual reference station information comprises measurement data of the second virtual reference station after the reference station combination used to calculate the virtual reference station of the mobile station is switched from the first reference station combination to the second reference station combination.

* * * * *